Patented June 13, 1950

2,511,222

UNITED STATES PATENT OFFICE 2,511,222

PYRROCOLINE POLYMETHINECYANINE DYES

Robert H. Sprague and Leslie G. S. Brooker, Rochester, N. Y., assignors to Eastman Kodak Company, Rochester, N. Y., a corporation of New Jersey No Drawing. Application October 1, 1946, Serial No. 700,393

7 Claims. (Cl. 260—240)

This invention relates to pyrrocoline polymethinecyanine dyes and to a process for preparing the same.

In our copending application Serial No. 407,033, filed August 15, 1941 (now United States Patent 2,409,612), we have disclosed pyrrocoline polymethinecyanine dyes which are useful as light-screening substances in photographic emulsions. We have found that some of these pyrrocoline polymethine dyes (especially the quinoline pyrrocoline dimethinecyanine dyes) are of use in the treatment of particular kinds of worm infestations. It is, accordingly, an object of our invention to provide pyrrocoline polymethinecyanine dyes. A further object is to provide a process for preparing these new dyes. Other objects will become apparent hereinafter.

The new pyrrocoline polymethinecyanine dyes of our invention can be represented by the following general formula:

I wherein R represents an alcohol radical, i. e. an alkyl group, e. g. methyl, ethyl, n-propyl, n-butyl, isobutyl, n-amyl, β-hydroxyethyl, β-ethoxyethyl, β-methoxyethyl, γ-hydroxypropyl, etc., L represents a methine group, e. g. —CH=, —C(CH₃)=, —C(Cl)=, etc., n represents a positive integer of from 1 to 2, Z represents the non-metallic atoms necessary to complete a heterocyclic nucleus containing 5 to 6 atoms in the heterocyclic ring, e. g. a heterocyclic nucleus of the thiazole series (for instance thiazole, 4-methylthiazole, 4-phenylthiazole, 4,5-diphenylthiazole, etc.), a heterocyclic nucleus of the benzothiazole series (for instance, benzothiazole, 5-chlorobenzothiazole, 6-chlorobenzothiazole, 5-dimethylaminobenzothiazole, 6-methoxybenzothiazole, 6-methylbenzothiazole, 5-methylbenzothiazole, 5-bromobenzothiazole, 4-methoxybenzothiazole, 7-chlorobenzothiazole, etc., a heterocyclic nucleus of the naphthothiazole series (for instance, α-naphthothiazole, β-naphthothiazole, etc.), a heterocyclic nucleus of the selenazole series (for instance, selenazole, 4-methylselenazole, 4-phenylselenazole, etc.), a heterocyclic nucleus of the benzoselenazole series (for instance benzoselenazole, 5-chlorobenzoselenazole, etc.), a heterocyclic nucleus of the benzoxazole series (e. g. benzoxazole, 5-phenylbenzoxazole, 5-chlorobenzoxazole, 5-methoxybenzoxazole, etc.), a heterocyclic nucleus of the quinoline series (for instance quinoline, 6-methoxyquinoline, 6-chloroquinoline, 3-chloroquinoline, 3-methylquinoline, 6-dimethylaminoquinoline, 6-acetylaminoquinoline, 6-phenylquinoline, 8-methylquinoline, 7-methylquinoline, 5-methylquinoline, 8-phenylquinoline, etc.), etc., d represents a positive integer of from 2 to 3, Q represents the non-metallic atoms necessary to complete a pyridine nucleus, R₁ and R₂ each represents a hydrogen atom, an alkyl group, e. g. methyl, or an aryl group, e. g. phenyl, p-bromophenyl, etc., and X represents an anion, e. g. chloride, bromide, iodide, methylsulfate, ethylsulfate, benzenesulfonate, β-toluenesulfonate, acetate, propionate, perchlorate, thiocyanate, etc.

To obtain our new pyrrocoline polymethinecyanine dyes, we condense a cyclammonium quaternary salt selected from those represented by the following general formula:

II wherein R, L, n, X and Z have the values given above, with a pyrrocoline selected from those represented by the following general formula:

III wherein Q, R₁ and R₂ have the values given above. The condensations are effected in the presence of substantially anhydrous acetic acid, e. g. glacial acetic acid. In acetic anhydride, the condensations do not take place. In contrast, it is to be noted that α-methylindole condenses with cyclammonium quaternary salts such as those of Formula II above, in acetic anhydride.

The following examples will serve to illustrate further the manner of obtaining our new dyes.

*Example 1.—(3-ethyl-2-benzoxazole)(2-phenyl-1-pyrrocoline)-dimethinecyanine iodide*

1.93 g. (1 mol.) 2-phenylpyrrocoline, 4.34 g. (1 mol.) 2-β-acetanilidovinyl benzoxazole ethiodide and 25 cc. glacial acetic acid were refluxed 10 minutes. Red coloration. Chilled, filtered, washed with acetone and water and dried. Yield of red crystals 4.45 g., 91 per cent. After recrystallization from absolute ethyl alcohol, (19 cc./g.)

the product was obtained as granular red crystals melting with decomposition at 204–205° C. Yield 3.9 g., 79 per cent. Methyl alcohol solution orange.

*Example 2.—(3-ethyl-2-benzoxazole) (2-methyl-1-pyrrocoline)di-methinecyanine iodide*

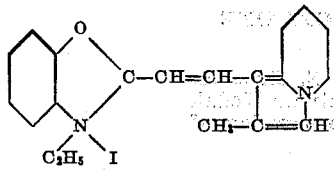

4.34 g. (1 mol.) 2-β-acetanilidovinylbenzoxazole ethiodide, 1.3 g. (1 mol.) 2-methylpyrrocoline and 15 cc. glacial acetic acid were refluxed 5 minutes. Red coloration. Chilled, filtered, washed with acetone and water and dried. Yield of green crystals 3.85 g., 90 per cent. After recrystallization from methyl alcohol, (39 cc./g.) the dye was obtained as green crystals with a golden reflex melting with decomposition at 245–246° C. Yield 3.2 g., 75 per cent. Methyl alcohol solution orange.

*Example 3.—(3-ethyl-2-benzoxazole)(2,3-dimethyl-1-pyrrocoline)-dimethinecyanine iodide*

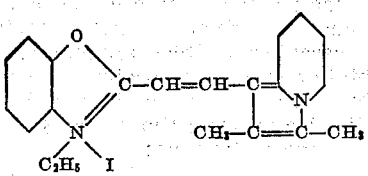

4.34 g. (1 mol.) 2-β-acetanilidovinylbenzoxazole ethiodide, 1.5 g. (1 mol.) 2,3-dimethylpyrrocoline and 25 cc. glacial acetic acid were refluxed 5 minutes. Red coloration. Chilled, stirred until crystalline, again chilled and filtered. Washed with acetone and water and dried. Yield of dark red crystals 3.85 g., 87 per cent. After recrystallization from methyl alcohol (42 cc./g.) the dye was obtained as greenish-red needles with green-reflex melting with decomposition at 266–267° C. Yield 3.55 g., 80 per cent. Methyl alcohol solution orange.

*Example 4.—3-ethyl-2-benzothiazole)(2-phenyl-1-pyrrocoline)-tetramethinecyanine chloride*

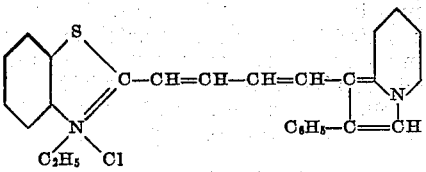

4.8 grams (1 mol.) 2-(4-acetanilido-1,3-butadienyl)-benzothiazole ethiodide, 1.93 grams (1 mol.) 2-phenyl-pyrrocoline and 30 cc. glacial acetic acid were refluxed 3 minutes. Blue coloration and green crystals of dye separated at once from the boiling mixture. Chilled, filtered, washed with acetone and water and dried. Yield 2.6 grams, 49 per cent. The product was extracted with 700 cc. boiling methyl alcohol. Residue of green crystals 1.3 grams, M. P. 257–259° C. The solution was chilled and yielded .65 grams green needles, M. P. 257–259° C. side by side with above. Combined yield 37 per cent. The dye was converted to chloride in 50 cc. cresol solution using 100 per cent excess freshly precipitated silver chloride. The mixture was stirred mechanically for 15 minutes at 100° C., filtered hot and chilled. Diluted to 400 cc. with ether and chilled overnight. The green crystals which separated were filtered off, washed with ether and acetone and dried. Yield 1.6 grams, 36 per cent. After recrystallization from absolute ethyl alcohol, (15 cc./g.) the product was obtained as green needles with bronze reflex melting at 85–86° C., yield 1.3 grams, 30 per cent. Methyl alcohol solution bluish-red.

*Example 5.—(3-ethyl-2-benzoxazole)(2-methyl-1-pyrrocoline)-tetramethinecyanine iodide*

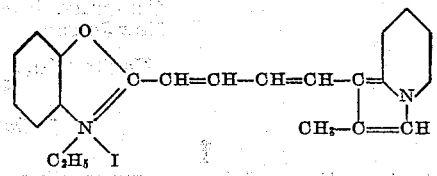

4.6 grams (1 mol.) 2-(4-acetanilido-1,3-butadienyl)-benzoxazole ethiodide, 1.3 grams (1 mol.) 2-methyl-pyrrocoline and 30 cc. glacial acetic acid were refluxed 5 minutes. Blue coloration. Green crystals separated at once from the boiling mixture. Yield 2.9 grams, 64 per cent. Dissolved in 50 cc. cresol (m and p mixture) heated to 125° C., filtered hot, cooled and diluted with 250 cc. methyl alcohol. Green crystals separated on chilling. Filtered, washed with methyl alcohol and dried. Yield 1.95 grams, 43 per cent, M. P. 247–250° C. with decomposition. Methyl alcohol solution blue.

*Example 6.—(3-ethyl-2-benzothiazole)(2,3-dimethyl-1-pyrrocoline)-tetramethinecyanine p-toluenesulfonate*

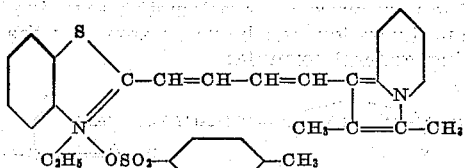

4.9 grams (1 mol.) 2(4-acetanilido-1,3-butadienyl)-benzothiazole-etho-p-toluenesulfonate, 1.45 grams (1 mol.) 2,3-dimethylpyrrocoline and 25 cc. glacial acetic acid were refluxed 5 minutes. The blue solution was cooled, diluted with 50 cc. acetone and 100 cc. ether and chilled. The dye which separated was filtered off, washed with ether, acetone and water and dried. Yield of green crystals, 2.3 grams, 43 per cent. After recrystallization from methyl alcohol (32 cc./g.) the product was obtained as bright green crystals melting with decomposition at 272–273° C. Yield 2.0 g., 38 per cent. Solution blue in methyl alcohol.

*Example 7.—(1,6-dimethyl-2-quinoline)(2-phenyl-1-pyrrocoline)-dimethinecyanine chloride*

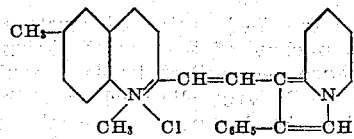

16 g. of 2-β-acetanilidovinyl-6-methylquinoline methiodide, 8 g. of 1-phenylpyrrocoline, and 100 cc. of glacial acetic acid were mixed and refluxed for 30 minutes. The dye-iodide separated in the hot. The reaction mixture was chilled and the solid filtered off. It was washed with acetone and then with hot water and dried. A yield of 13.5 g. (65 per cent) of blue green needles was obtained which after two recrystallizations from methyl alcohol had a melting point of 267–269° C. with decomposition. Analysis: I calc. 25.28; found 25.33.

15.4 g. of purified dye-iodide were converted to the dye-chloride by treating with a boiling methyl alcoholic solution with silver chloride prepared from 11 g. of silver nitrate. The silver salts were filtered off and the filtrate concentrated to a small volume on a steam bath. The dye-chloride was precipitated from the residue with diethyl ether in the form of a dull green powder. It was filtered off and washed with diethyl ether and dried. A yield of 11 g. of dye-chloride of melting point of 251–252° C. with decomposition was obtained which was an 87 per cent yield. Analysis: Cl calc. 8.63; found 8.65.

In the same manner described in the above Example 7, (1-methyl-2-quinoline)(2-methyl-1-pyrrocoline)dimethinecyanine chloride can be prepared from 2-acetanilidovinylquinoline methiodide and 2-methyl-1-pyrrocoline; (1-methyl-4-quinoline)(2,3 - dimethyl-1-pyrrocoline)dimethinecyanine chloride can be prepared from 4-acetanilidovinylquinoline methiodide and 2,3-dimethyl-1-pyrrocoline; (1-methyl-6-dimethylaminoquinoline)(2 - methyl-1-pyrrocoline)dimethinecyanine chloride can be prepared from 2-acetanilidovinyl-6-dimethylaminoquinoline methiodide and 2-methyl-1-pyrrocoline, etc.

The dye-chlorides and dye-toluenesulfonates described above can be converted to the corresponding dye-bromides by treating a hot methyl alcoholic solution of the dye-chloride or dye-toluenesulfonate with a concentrated aqueous solution of potassium bromide. The dye-bromide separates out, upon chilling, if necessary. The dye-iodides can be converted to the corresponding dye-perchlorates by treating a hot methyl alcoholic solution of the dye-iodide with a concentrated aqueous solution of sodium perchlorate. The dye-perchlorate separates out. Dyethiocyanates can be made from dye-iodides by stirring the dye-iodide with a hot methyl alcohol suspension of silver thiocyanate, filtering off the silver salts, and isolating the dye-thiocyanate from the methyl alcohol solution.

The herein-described quinoline dimethine dyes are of particular value in the treatment of worm infestations where the invading organism is of the class Nematoda (round worms). Among the various species of worms affected by these compounds are hookworms, ascorids, filarids and whipworms. The quinoline dimethine dyes containing an anion, such as chloride, benzenesulfonate, p-toluenesulfonate, methylsulfate, ethylsulfate, acetate or propionate are the more soluble compounds and the most useful therapeutically.

The instant application is a continuation-in-part of our copending application Serial No. 407,033, filed August 15, 1941, now Patent No. 2,409,612, October 22, 1946, as a division of application Serial No. 317,726, filed February 7, 1940 (now U. S. Patent 2,298,731, dated October 13, 1942).

What we claim as our invention and desire to be secured by Letters Patent of the United States is:

1. The pyrrocoline polymethinecyanine dyes which are represented by the following general formula:

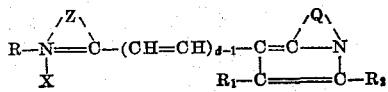

wherein R represents a primary alkyl group containing from 1 to 5 carbon atoms, X represents an anion, Z represents the non-metallic atoms necessary to complete a heterocyclic nucleus selected from the group consisting of benzoxazole nuclei, benzothiazole nuclei and quinoline nuclei, d represents a positive integer of from 2 to 3, Q represents the non-metallic atoms necessary to complete a pyridine nucleus, R1 and R2 each represents a member selected from the group consisting of a hydrogen atom, a methyl group and an aryl group of the benzene series.

2. The pyrrocoline dimethinecyanine dyes which are represented by the following general formula:

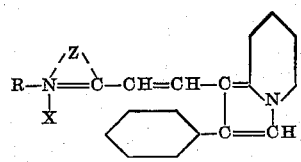

wherein R represents a primary alkyl group containing from 1 to 5 carbon atoms, X represents an anion and Z represents the non-metallic atoms necessary to complete a benzoxazole nucleus.

3. The pyrrocoline dimethinecyanine dye which is represented by the following formula:

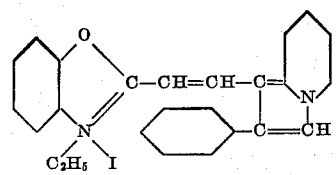

4. The pyrrocoline dimethinecyanine dyes which are represented by the following general formula:

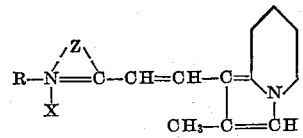

wherein R represents a primary alkyl group containing from 1 to 5 carbon atoms, X represents an anion, and Z represents the non-metallic atoms necessary to complete a benzoxazole nucleus.

5. The pyrrocoline dimethinecyanine dye which is represented by the following formula:

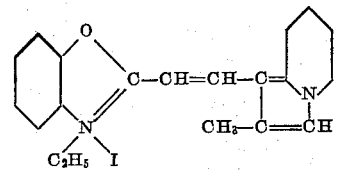

6. The pyrrocoline dimethinecyanine dyes which are represented by the following general formula:

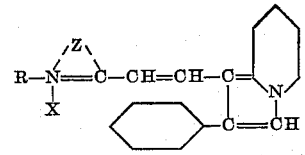

wherein R represents a primary alkyl group containing from 1 to 5 carbon atoms, X represents an anion and Z represents the non-metallic atoms necessary to complete a quinoline nucleus.

7. The pyrrocoline dimethinecyanine dye which is represented by the following formula:
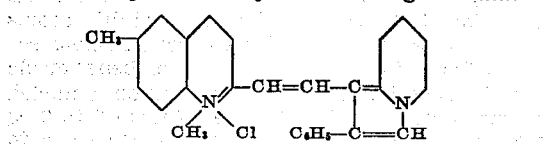
ROBERT H. SPRAGUE.
LESLIE G. S. BROOKER.
REFERENCES CITED
The following references are of record in the file of this patent:
FOREIGN PATENTS
| Number | Country | Date |
|---|---|---|
| 529,440 | Great Britain | Nov. 21, 1940 |